United States Patent [19]
Cirino et al.

[11] Patent Number: 5,454,667
[45] Date of Patent: Oct. 3, 1995

[54] ADJUSTABLE CARTRIDGE FOR CUTTING HEAD OF A MACHINE TOOL

[75] Inventors: John M. Cirino, Waite Hill; Richard P. Waiwood, Willoughby, both of Ohio

[73] Assignee: Master Tool Corporation, Grand River, Ohio

[21] Appl. No.: 129,985

[22] Filed: Sep. 30, 1993

[51] Int. Cl.⁶ ............................................. B23B 29/02
[52] U.S. Cl. ........................... 408/181; 408/153; 408/713
[58] Field of Search .............................. 408/181, 182, 408/183, 184, 185, 147, 153, 713

[56] References Cited

U.S. PATENT DOCUMENTS

| | | | |
|---|---|---|---|
| 3,343,431 | 9/1967 | Boyer | 408/181 |
| 3,591,305 | 7/1971 | Aichhorn. | |
| 3,656,859 | 4/1972 | Rietzler et al. | |
| 3,856,427 | 12/1974 | Lovendahl | 408/182 |
| 3,880,545 | 4/1975 | Kress. | |
| 4,003,670 | 1/1977 | Ewing | 408/185 |
| 4,125,342 | 11/1978 | Kress. | |
| 4,211,507 | 7/1980 | Kress et al. | |
| 4,231,691 | 11/1980 | Pape et al. | 408/185 |
| 4,250,775 | 2/1981 | Jerue et al. | |
| 4,279,550 | 7/1981 | Kress et al. | |
| 4,293,252 | 10/1981 | Kress et al. | |
| 4,309,133 | 1/1982 | Hamilton | 408/183 |
| 4,344,724 | 8/1982 | Kress et al. | |
| 4,362,445 | 12/1982 | Armbrust | 408/182 |
| 4,423,989 | 1/1984 | Kress et al. | |
| 4,428,704 | 1/1984 | Kalokhe | 408/185 |
| 4,611,959 | 9/1986 | Kress et al. | |
| 4,975,002 | 12/1990 | Kress et al. | |
| 5,149,233 | 9/1992 | Kress et al. | |

FOREIGN PATENT DOCUMENTS

| | | | |
|---|---|---|---|
| 2235782 | 2/1973 | Germany | 408/161 |
| 3333495 | 3/1985 | Germany | 408/185 |

Primary Examiner—Daniel W. Howell
Attorney, Agent, or Firm—Fay, Sharpe, Beall, Fagan, Minnich & McKee

[57] ABSTRACT

An adjustable cartridge assembly is provided for a cutting head of a machine tool. The cartridge fixes the back rake angle of the cutting blade so that mere radial adjustment is required to adjust the blade. Moreover, the cartridge includes a support portion that matingly receives the blade and provides support along three contiguous surfaces.

12 Claims, 2 Drawing Sheets

ADJUSTABLE CARTRIDGE FOR CUTTING HEAD OF A MACHINE TOOL

BACKGROUND OF THE INVENTION

This invention pertains to the art of cutting tools, and more particularly to a boring tool or reamer. The invention is particularly applicable to those tools in which a cutting element or blade is adjustable relative to the remainder of the cutting head and will be described with particular reference thereto. However, it will be appreciated that the invention has broader applications and may be advantageously employed in still other environments and applications.

Precision cutting of a workpiece for providing a close tolerance bore, chamfer, groove, etc. is well known in the art. A rotary cutting tool such as a reamer is typically used to cut the workpiece. Selective control of the position of the cutting tool relative to the workpiece is provided by a numerical processor controller, for example, as shown and described in U.S. Pat. No. 4,250,775. Particular details of the positional control of the cutting tool form no part of the subject invention so that further discussion herein is deemed unnecessary.

Secured to a rotating spindle of the cutting tool is a head that incorporates one or more cutting blades or inserts. The blades extend radially outward from the rotational axis of the cutting head and are set at a predetermined angle relative to the workpiece to provide a desired cut. As will be understood, the location of the edge of the cutting blade must be carefully controlled and is subject to wear, thereby requiring periodic adjustment and replacement. Many prior art arrangements employ an adjustable wedge-shaped member that engages a portion of the cutting blade. The wedge is advanced or retracted through suitable threaded adjustment members to locate and clamp a base portion of the cutting blade as desired. In fact, these arrangements oftentimes include plural, axially spaced adjustment wedges or clamp jaws that require an inordinate amount of time to adjust the blade for a desired cutting operation.

As will be understood, any downtime associated with replacing or adjusting a cutting blade is necessarily undesirable. Moreover, multiple adjustment members compound the adjusting procedure and require repeated measuring steps since adjustment of one portion of the blade effects the location of the remainder of the blade. Continued minute adjustment eventually results in an accurate location or position of the blade but not without associated expense of tool downtime. Multiple gages and fixtures are often necessary to complete setup and adjustment of known rotary cutting tool arrangements. In still other arrangements, an entire tool must be replaced.

Still other adjustable cutting blade arrangements provide inadequate support for the cutting blade. Inadequate blade support can lead to a number of problems. For example, premature blade wear may result. Inconsistent cutting pressure and poor tool performance are still other potential problems associated with insufficient blade support.

Minimizing the amount of time required for setup and adjustment, while maintaining adequate support for the cutting blade are competing concerns that have not been adequately addressed by prior art arrangements. Accordingly, it has been desired to provide an easily adjustable, highly accurate, and fully supported adjustable cutting blade arrangement that meets the various needs of the rotary cutting tool industry.

SUMMARY OF THE INVENTION

The present invention contemplates a new and improved adjustable cartridge for a head of a rotary cutting tool that overcomes all of the above-referenced problems and others and provides a highly accurate adjustable cutting blade arrangement that maximizes support of the blade.

According to the present invention, there is provided a removable cartridge received in the cutting head for selective radial adjustment relative thereto. The cartridge includes a support adjacent one end that receives the blade in fixed relation, the blade being substantially supported along three orthogonally disposed surfaces.

According to a more limited aspect of the invention, the support portion of the cartridge is offset from a plane incorporating the radial axis of movement of the cartridge.

According to yet another aspect of the invention, the edge of the blade is non-perpendicularly disposed relative to the radial axis of movement of the cartridge.

According to an alternate aspect of the invention, a cavity is formed in the cutting head to receive a cartridge having a precisely ground angle or back face. The cartridge is temporarily secured to the cutting head and subsequently permanently secured to the cutting head.

A principal advantage of the invention resides in the ability to quickly and easily adjust the location of the cutting blade while maintaining a proper back rake angle.

Another advantage of the invention is found in the increased support and rigidity provided to the cutting blade.

Yet another advantage resides in the ease with which cutting blades can be replaced with accuracy and easy adjustment.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENTS

Figure 1:
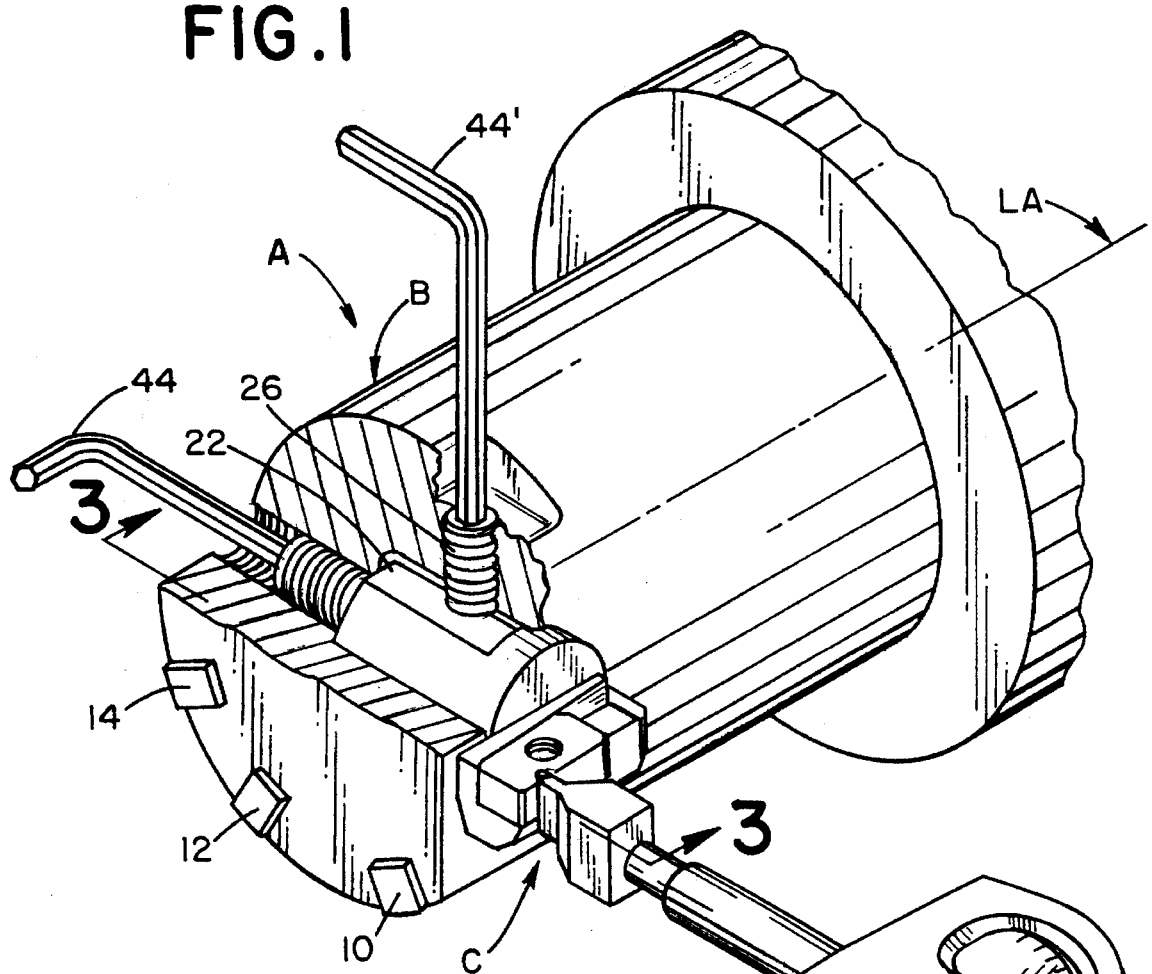
FIG. 1 is a perspective view of a cutting head incorporating the subject new adjustment cartridge.

Referring now to the drawings wherein the showings are for purposes of illustrating preferred embodiments of the invention only, and not for purposes of limiting same, the FIGURES show a portion of a machine tool A having a cutting head B that receives a cartridge C. The illustrated machine tool A is a rotary cutting tool or reamer in which a motor rotates the cutting head B about a longitudinal axis.

Figure 2:
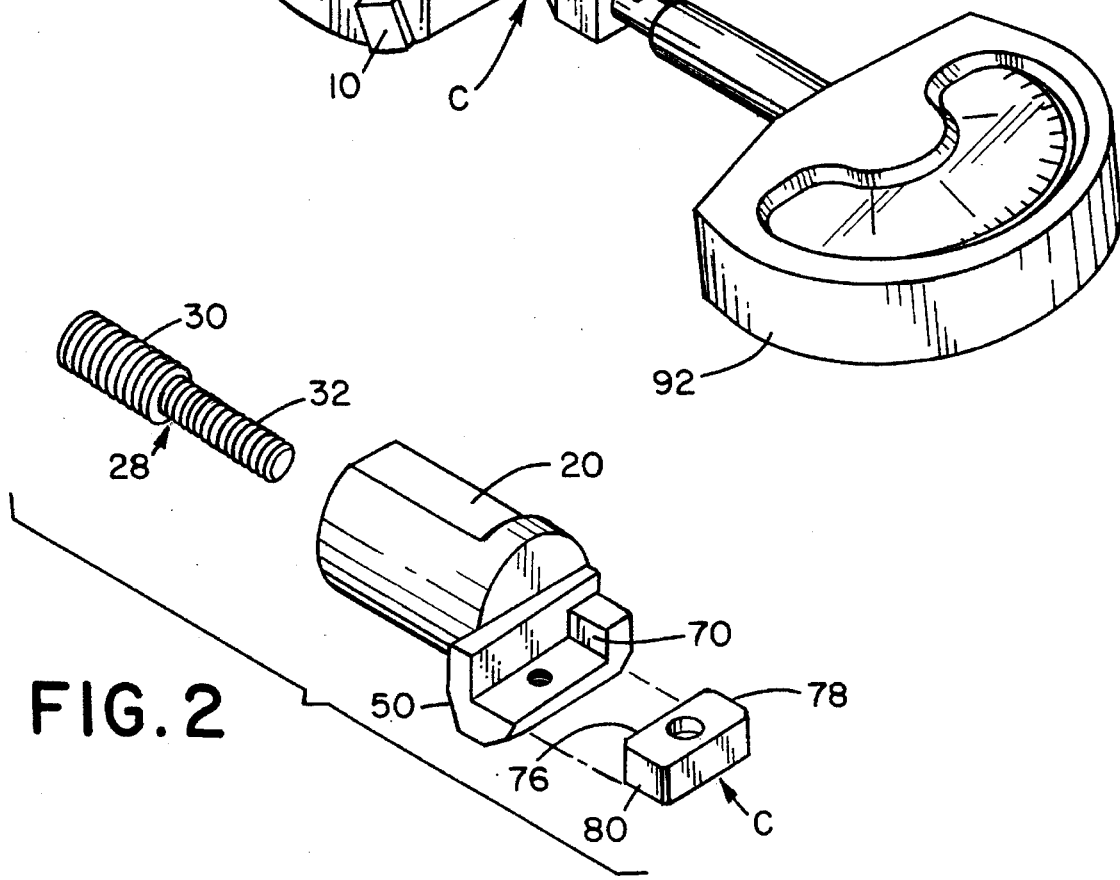
FIG. 2 is a perspective view of the cartridge assembly separated from the cutting head.
Figure 3:
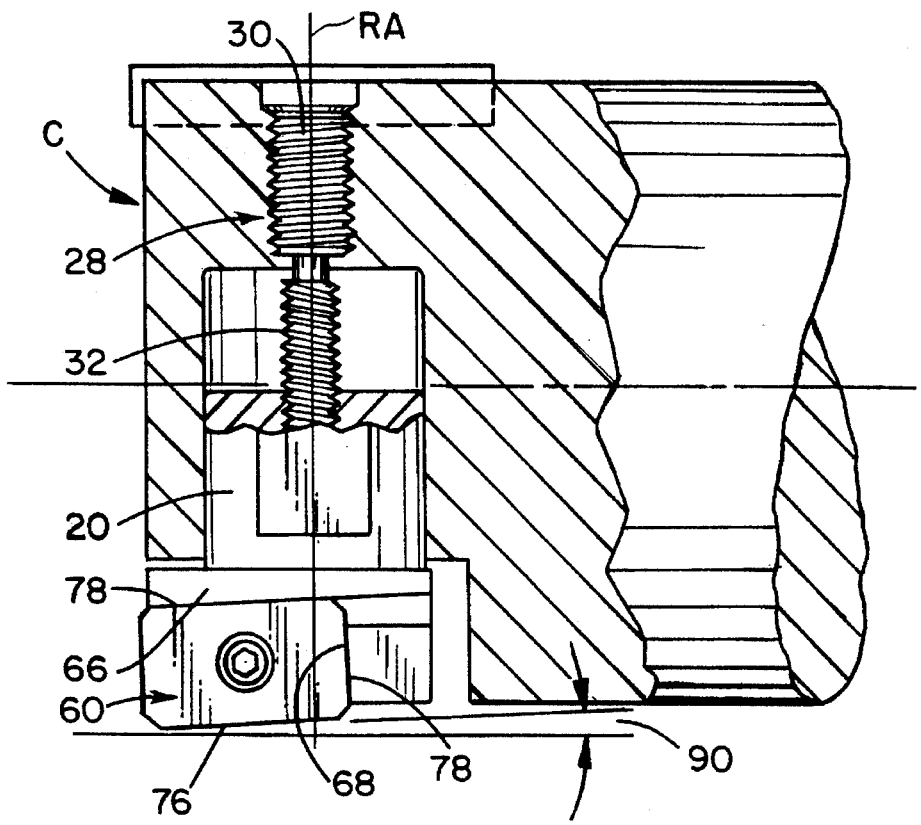
FIG. 3 is a cross-sectional view taken generally along the lines 3—3 of FIG. 1.

Portions of the cutting head are cut away for ease of reference in FIGS. 1–3. As shown there, a first preferred embodiment of the invention shows a cutting head having a series of guide members or wear pads 10, 12, 14 circumferentially spaced about the cutting head. The guide members are formed of a hardened metal material such as carbide and are adapted to contact the workpiece, such as the interior wall of a bore. Because of the hardened nature of this material, outer peripheral surfaces of the wear pads extend radially from the remainder of the cutting head so that each contacts the workpiece, as opposed to the cutting head contacting the workpiece. The guide members/wear pads are located at a radial dimension slightly less than the desired diameter of the bore of the workpiece (not shown) being worked on by the cutting tool.

The cartridge C extends substantially perpendicular to the longitudinal axis of rotation. That is, and with additional reference to FIG. 2, the cartridge includes a generally cylindrical portion closely dimensioned for receipt in a radial bore 22 of the cutting head. The cylindrical portion includes a planar or flat surface 24 that cooperates with a set screw 26 so that once the desired radial position of the cartridge is obtained, the set screw is tightened by a tool and the cartridge held against movement or rotation within the bore portion, i.e. protrudes longitudinally, so as to provide full support to cutting blade or insert 60. A fastener 62 secures the cutting blade to the support portion, particularly within a cutout ledge 64. The cutout ledge includes three orthogonal surfaces 66, 68, 70 that respectively define the length, width, and depth of the ledge. As will be appreciated, the cutting blade 60 has length, width, and depth dimensions 76, 78, 80 substantially identical to the surfaces 66, 68, 70.

The surface 68 of the cutout ledge is disposed in non-parallel relation with the radial axis RA, and likewise, the length surface 66 of the ledge is disposed in non-perpendicular relation to the radial axis. Since the blade is oriented at an angle 90 relative to the peripheral surface of the cutting head (known as the back rake angle), it is necessary for the ledge portion to be similarly oriented. In other words, the back rake angle is fixed in the ledge portion of the cartridge so that remaining components of the cutting tool need not be specially configured to provide the desired back rake angle. For example, bore 22 is perpendicular to the central axis of the cutting head. Likewise, the cavity 48 that receives the support portion 50 of the cartridge is defined by surfaces that are either parallel or perpendicular to the central axis of the cutting head. This eliminates any special machining of precise angles in the cutting head to achieve the desired back taper. Therefore, radial adjustment of the cartridge assembly does not alter the back rake angle, but merely advances and retracts the cutting blade relative to the workpiece. If a different back rake angle is desired, a different adjustable cartridge can simply be inserted into the cutting head.

Another important feature is the increased rigidity and support provided by the support portion 50 along the three surfaces 66, 68, 70. This adds increased stability and corresponds to a more precise cut that can be achieved with this cutting tool. A cartridge having a predetermined back rake angle is inserted into the cutting head. By use of tool 44, the cartridge and cutting blade are radially advanced or retracted as desired and as determined by measuring device 92. Once the desired radial position of the cutting blade is determined, tool 44' is then tightened to maintain the selected radial position of the cartridge. If the blade wears after use, and adjustment is desired, these steps are merely reversed. That is, the set screw 26 is released from contact with the planar surface 24. The radial position of the cartridge is then adjusted via threaded member 28 to a new, desired location. The set screw is then tightened and the tool is ready for continued use.

Additionally, in some arrangements, the cutting blade 60 can be reversed by removing fastener 62 and presenting new cutting edges for use. The length, width, and depth dimensions of the blade are such that at least one reversible position of the blade can be achieved. In other arrangements, though, the blade is not designed for reversibility and instead the cartridge is removed and a different cartridge with a sharpened cutting blade inserted in its place.

Figure 4:
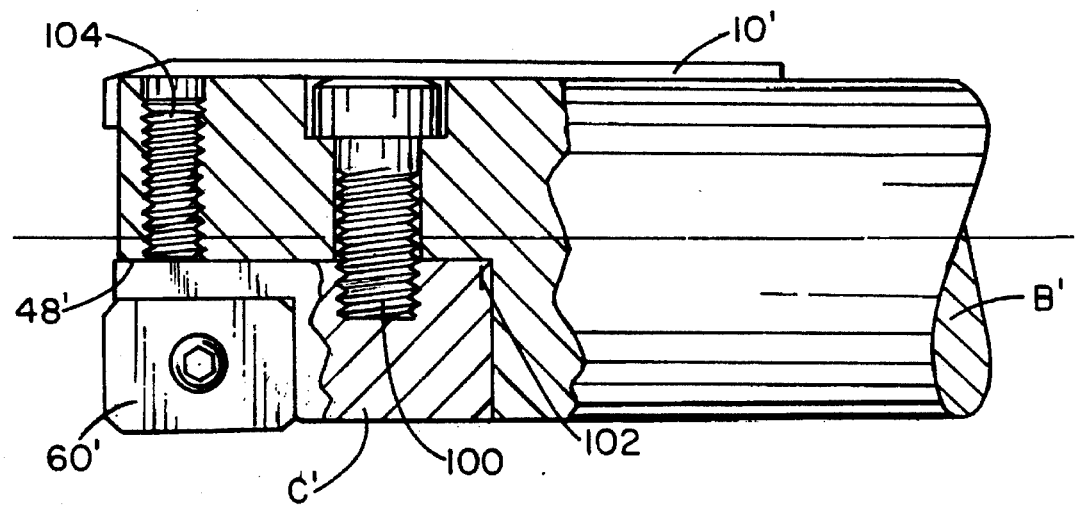
FIG. 4 is a longitudinal cross-sectional view of a smaller diameter rotary cutting tool illustrating a second preferred embodiment of the invention.

Turning now to FIG. 4, a second preferred embodiment of the invention will be described in greater detail. For ease of reference, like components will be referred to by like numerals with a primed (') suffix while new components will be identified by new numerals. Whereas the embodiment of FIGS. 1–3 is particularly applicable to large bore diameters having a minimum dimension of approximately 1.250 inches, the FIG. 4 embodiment finds particular application in smaller bore arrangements on the order of 0.500 inches in diameter. The cutting tool A' has a cutting head B' that includes a series of carbide wear pads 10'. The wear pads extend radially outward a predetermined dimension from the cutting head so that the head itself does not contact the interior surface defining bore of the workpiece (not shown) during the cutting operation.

A cavity 48' is formed in the cutting head and is preferably defined by surfaces that are parallel and perpendicular to the central axis of the cutting head. The cavity is adapted to receive a cartridge C' therein. The cartridge has a precise ground angle or back face rake angle formed therein for purposes to be described in greater detail below. The cartridge is initially and temporarily secured to the cutting head by a fastener such as a cartridge mounting screw 100. The mounting screw maintains the cartridge in place until the cartridge is more permanently secured or fixed to the cutting head, for example by a weld 102. The weld 102 is preferably at an inner corner or edge of the cartridge so that a limited range of movement of the cartridge can be obtained through a diameter and back taper adjustment means, such as adjustment screw 104.

A cutting blade or reamer insert 60' is secured to the cartridge in the same manner as described above. Through use of the weld and adjustment screw arrangement, the cutting edge of the blade can be easily and precisely located a predetermined radial dimension from the surface of the cutting head and the wear pads. This arrangement also assures that an accurate back taper (on the order of 0.1 to 0.8) is achieved which, as well known in the art, is critical to precision cutting of the workpiece.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a machine tool having a cutting head adapted for selective rotation by a motor, the cutting head including a blade extending radially outward from the head adapted to cut an associated workpiece, and an adjusting member for moving the cutting blade relative to the cutting head, the improvement comprising:

a cartridge disposed in the cutting head for selective radial movement relative thereto, the cartridge including a moving assembly that radially moves the cartridge, and further including an elongated cylindrical portion having a flattened region along a circumferential portion thereof and a support portion at one end of the cylindrical portion that receives the cutting blade in fixed relation, the support portion substantially supporting the blade along three orthogonally disposed surfaces so that the back rake angle is maintained constant during adjustment.

2. The invention as defined in claim 1 wherein a cutting edge of the blade is non-perpendicularly disposed relative to the radial axis of movement of the cartridge.

3. The invention as defined in claim 1 wherein each of the three surfaces is contiguous to the remaining two surfaces.

4. The invention as defined in claim 1 wherein a cutting edge of the blade is coplanar with a plane incorporating the radial axis of movement of the cartridge.

5. The invention as defined in claim 4 wherein the support portion is offset from the plane that incorporates the radial axis of movement.

6. The invention as defined in claim 1 wherein the support portion is disposed entirely on one side of a longitudinal axis of the cylindrical portion and includes a cutout ledge extending inwardly from an edge of the support portion with a length, width and depth closely matching length, width, and depth dimensions for the cutting blade, the length and width dimensions of the cutout ledge being perpendicular to one another and being non-perpendicular and non-parallel, respectively, to the radial axis of movement of the cartridge.

7. A cutting tool for precision boring of a workpiece comprising:

a cutting head adapted for selective rotation about a longitudinal axis;

at least one cartridge received in a cavity in the cutting head, the cartridge being temporarily securing the cutting head and subsequently permanently securing the cutting head along one corner of the cartridge, the cartridge being welded to the cutting head along one corner of the cartridge, and a hardened cutting blade secured to the cartridge having a predetermined back rack angle that is non-parallel with the longitudinal axis.

8. The cutting tool as defined in claim 7 further comprising means for adjusting the radial location of the cutting blade.

9. The cutting tool as defined in claim 8 wherein the adjusting means is spaced from the one corner of the cartridge.

10. the cutting tool as defined in claim 7 further comprising a threaded fastener for temporarily securing the cartridge to the cutting head.

11. The cutting tool as defined in claim 10 wherein the threaded fastener engages the cartridge at a region adjacent one corner of the cartridge.

12. The cutting tool as defined in claim 11 further comprising means for adjusting the radial location of the cutting blade.

* * * * *